UNITED STATES PATENT OFFICE.

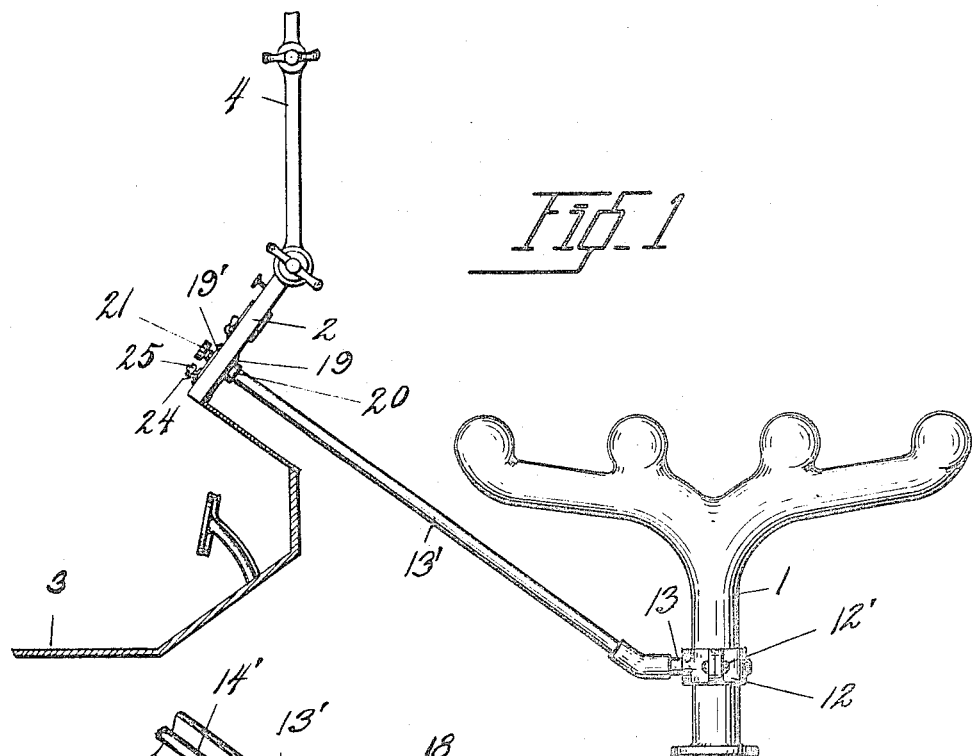
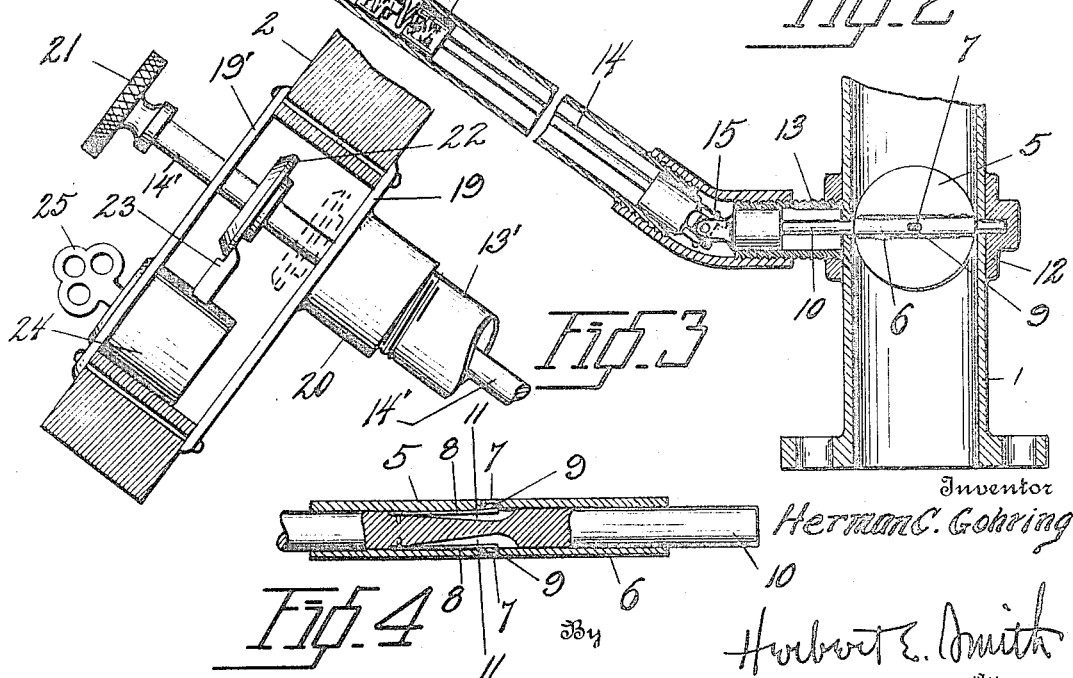

HERMAN C. GOHRING, OF SPOKANE, WASHINGTON.

AUTOMOBILE-LOCK.

1,282,067.  Specification of Letters Patent.  Patented Oct. 22, 1918.

Application filed April 8, 1918. Serial No. 227,336.

*To all whom it may concern:*

Be it known that I, HERMAN C. GOHRING, a citizen of the United States, residing at Spokane, in the county of Spokane and State of Washington, have invented certain new and useful Improvements in Automobile-Locks, of which the following is a specification.

The present invention relates to improvements in automobile locks, and is designed to provide means for shutting off the supply of fuel or gas to the motor when the automobile is not to be used, said means being under control of the automobile driver, and access for operation, from the front seat of the car, being provided so that the car or automobile may be quickly rendered out of commission or inoperative by the driver. By the utilization of the invention the driver is enabled to cut off the supply of fuel gas, entirely, by the simple movement of pushing a button or knob, located directly in front of him, and the knob itself may be locked against movement as will be hereinafter described.

In the accompanying drawings one complete example of the physical embodiment of the invention is illustrated and arranged according to the best mode so far devised for the practical application of the principles of the invention.

Figure 1 is a diagrammatic view showing part of the automobile manifold and front part of the car, with the device of the invention applied thereto in operative position.

Fig. 2 is a vertical sectional view of part of the manifold and of part of the housing for the operating parts of the device.

Fig. 3 is a detail view, enlarged, of the head parts of the device, at the dash board.

Fig. 4 is a detail view of the butter-fly valve construction.

The device is applicable for use and operates in connection with the manifold of the usual internal combustion engine, and such a manifold is indicated in the drawings at 1, the dash board of the car is designated 2, the bottom 3, and the wind shield 4, all in Fig. 1.

The flow of gaseous fuel to the engine through the manifold is cut off when desired through the instrumentality of a butter fly valve 5 in the shape of a circular disk, of metal, which fits snugly in the cylindrical walls of the manifold. The valve is provided with a center sleeve 6 in which are fashioned sockets 7 7 arranged diametrically opposite each other and a pair of spring arms 8 8 have keys 9 9 to seat in these sockets in order to hold the valve on the pintle 10 which latter is recessed or grooved at 11 for the spring arms. A bearing band 12 encircles the manifold and is clamped thereon by means of the bolt or rivet 12' in order to provide a bearing for the pintle 10 which projects through openings in the manifold and also to receive the threaded sleeve 13 to which is connected the tubular housing or pipe 13' extending from the manifold to the dash board and inclosing an operating shaft made up of the two sections 14 and 14'. The lower section 14 of the shaft is connected to the pintle of the valve by a universal joint 15 so that the pintle and valve may be turned with facility when the shaft is operated, and the two shaft sections are joined by a clutch device comprising the members 16 and 17 on the respective sections and the protractile spring 18 is designed to normally hold these clutch members separated.

In the enlarged detail view Fig. 3 it will be seen that the housing is connected to the dash board by means of the two plates 19 and 19', the former having a sleeve 20 to receive and retain the housing, and the shaft section 14' passes through these plates and is provided at the end with an operating knob 21 to be used in pushing the shaft and turning the same.

A locking disk 22 is fixed on the shaft section 14' which is engaged by the locking tongue or latch 23 of the lock 24 that is actuated by a key as 25, and the key of course is removable and may be withdrawn from the lock when not to be used.

In the position shown in Fig. 3 the latch 23 is in position to prevent downward movement of the knob and disk, and of course the clutch members cannot be engaged, nor can the shaft be turned to close the butter fly valve. When it is desired to close the communication through the manifold and shut off any possible passage of fuel gas therethrough, the key is turned so that the latch will permit movement of the disk and then the knob is pushed inwardly to engage the clutch members, and when so engaged, the shaft is turned to close the valve, and when the pressure on the knob is released the spring 18 by its resiliency, lifts the clutch member 17, shaft section 14' and the knob with the disk from the dotted position of Fig. 3 to the full line position, and the disk is now engaged on its top surface by the latch 23. The key may now be withdrawn, and it will be seen that the knob cannot be depressed, nor the clutch engaged, to move the valve, so that the valve remains closed to prevent passage of gaseous fuel through the manifold. In order to open the valve, the lock must be actuated to unlatch the disk, and permit closing of the clutch as described.

Claim.

The combination with the manifold of an internal combustion engine and a suitable support, of a valve to close the manifold, a housing between the support and manifold, a flexible shaft inclosed in the housing operatively connected to the valve and provided with a depressible portion, and a clutch forming part of the shaft within the housing to co-act with the depressible portion of the shaft, whereby the clutch may be closed and the shaft turned to operate the valve.

In testimony whereof I affix my signature.

HERMAN C. GOHRING.